United States Patent
D'Angelico

(10) Patent No.: US 7,327,200 B2
(45) Date of Patent: Feb. 5, 2008

(54) DEVICE FOR OPERATING A VIBRATING UNIT OF A VIBRATION RESONATOR

(75) Inventor: Sascha D'Angelico, Efringen-Kirchen (DE)

(73) Assignee: Endress + Hauser GmbH + KG, Maulburg (DE)

( * ) Notice: Subject to any disclaimer, the term of this patent is extended or adjusted under 35 U.S.C. 154(b) by 54 days.

(21) Appl. No.: 10/538,841

(22) PCT Filed: Dec. 6, 2003

(86) PCT No.: PCT/EP03/13842

§ 371 (c)(1),
(2), (4) Date: Dec. 19, 2005

(87) PCT Pub. No.: WO2004/055485

PCT Pub. Date: Jul. 1, 2004

(65) Prior Publication Data

US 2006/0145774 A1  Jul. 6, 2006

(30) Foreign Application Priority Data

Dec. 13, 2002 (DE) ................. 102 58 736

(51) Int. Cl.
*H03B 5/32* (2006.01)
(52) U.S. Cl. ............... 331/158; 331/74; 331/116 R; 331/116 FE
(58) Field of Classification Search ........ 331/158, 331/116 R, 116 FE, 74; 310/317
See application file for complete search history.

(56) References Cited

U.S. PATENT DOCUMENTS

| | | | |
|---|---|---|---|
| 3,800,170 A | 3/1974 | Kline | |
| 4,578,650 A | 3/1986 | Watson | |
| 4,595,854 A * | 6/1986 | Yano et al. | 310/317 |

FOREIGN PATENT DOCUMENTS

DE 196 21 449 A1 12/1997

* cited by examiner

*Primary Examiner*—Arnold Kinkead
(74) *Attorney, Agent, or Firm*—Bacon & Thomas, PLLC

(57) ABSTRACT

A device for operating an oscillatable unit of a vibration resonator, including a piezodrive, which is connected with the oscillatable unit, and feedback electronics. The feedback electronics excites the piezodrive to oscillate by means of a periodic exciter signal having rising and falling edges. The response signal of the piezodrive is fed back to the feedback electronics. Present additionally is at least one peak compensation unit, which removes from the response signal at least one interference signal, which results from the charge-reversal process of the piezodrive. Provided in the peak compensation unit, is at least one suppression unit having at least one switch element. The suppression unit is controlled by the exciter signal of the feedback electronics in such a manner that the piezodrive is connected conductively to ground during the rising and/or during the falling edges of the exciter signal.

15 Claims, 3 Drawing Sheets

DEVICE FOR OPERATING A VIBRATING UNIT OF A VIBRATION RESONATOR

FIELD OF THE INVENTION

The invention relates to a device for operating an oscillatable unit of a vibration resonator, including a piezodrive, which is connected with the oscillatable unit, and a feedback electronics, with the feedback electronics exciting the piezodrive to oscillate by means of a periodic exciter signal with rising and falling edges, and with a response signal of the piezodrive being fed back to the feedback electronics, and at least one peak compensation unit, which removes from the response signal at least one interference signal originating from the charge-reversal process of the piezodrive.

BACKGROUND OF THE INVENTION

Known from German Patent DE 196 21 449 is a device with which a vibratory fill-level limit switch can be operated. The limit switch includes a vibration resonator, which is connected in the feedback branch of a self-excitable transducer system with amplifying arrangement. In such case, a piezo-element is provided in the vibration resonator, both for exciting oscillation and for oscillation detection. The exciter signal of the amplifying arrangement, with which signal the piezo-element is excited to oscillate, involves periodic, rectangular signals. During the edges of the exciter signal, the piezo-element undergoes charge reversal, and this leads to charge-reversal signals in the response signal. The circuit presented in the Patentschrift has the task of removing these charge-reversal signals and of minimizing the duration of the charge-reversal process. For this task of signal removal, a control circuit is presented, which is controlled by the exciter signal and which decouples the output of the piezo-element from the amplifier arrangement. The minimizing of the duration of the charge-reversal process is achieved by a charging current control circuit, which produces a virtual reference. Both circuits contain, among other things, operational amplifiers and a semiconductor switch. Disadvantageous in this device is that the aforementioned components are relatively expensive.

SUMMARY OF THE INVENTION

An object of the invention is to provide a device with which the interference signal of the charge-reversal process is removed from the response signal of the piezodrive. This should be obtained using an embodiment with as few components as possible and those components which are present should be favorably priced.

The invention achieves this object in a first embodiment by providing in the peak compensation unit at least one suppression unit having at least one switch element, which is controlled by the exciter signal of the feedback electronics in such a manner that the piezodrive is connected conductively to ground during the rising, and/or during the falling, edges of the exciter signal.

An idea of the invention is to short-circuit the piezodrive to ground via the peak compensation unit during the edges of the exciter signal, i.e. during the times when the interference signals are being caused. In this way, on the one hand, the response signal does not get to the feedback electronics during the time of these edges, so that the charge-reversal signals are effectively removed. On the other hand, the total resistance, with which the piezodrive forms an RC-member, is minimized. This has also the advantage that the charge-reversal time of the piezodrive is minimized. The total resistance is composed, especially, of a resistance, which will be explained below (current-to-voltage converter) and of additional, internal resistances of the circuit, which can be necessary, for example, for reasons of explosion protection.

The first embodiment of the invention is a device for operating an oscillatable unit of a vibration resonator. The device includes a piezodrive and a feedback electronics. The feedback electronics excites the piezodrive to oscillate by means of a periodic exciter signal having rising and falling edges. In this way, the mechanically oscillatable unit, which is connected with the piezodrive, is caused to oscillate. The exciter signal can be, in an advantageous embodiment, a periodic, rectangular signal. Examples of the mechanically oscillatable unit are a tuning fork or an oscillating rod. Through the oscillation of the mechanically oscillatable unit, the piezodrive delivers a response signal, which is fed back to the feedback electronics. This response signal is composed of the actual oscillation detection signal and an interference signal. The oscillation detection signal permits, e.g. via the frequency, a determination of whether a fill level of a medium in a container has been reached. Used for this is the fact that the resonance frequency of the oscillatable unit changes, when it is covered by a medium, in comparison to the frequency, when it is oscillating freely. The other component in the response signal is an interference signal, which results from the charge-reversal of the piezodrive always when the sign of the voltage change changes. A change of the sign of the voltage change means e.g. that the voltage changes from a positive to a negative sign, or vice versa, or that the voltage changes from a greater to a smaller value, or vice versa. The charge-reversal is a result of the fact that the piezodrive, among other things, also exhibits the character of a capacitor. This signal shows a marked rise and then declines exponentially, with the time-constant (t1) being a function of the capacitance of the piezodrive and the total resistance, with which the piezodrive forms an RC-element. If the rising and falling edges of the exciter signal are very steep, then the duration of the charge-reversal process becomes shorter. The decay of the interference signal is, however, as already mentioned, given by the components. From this, the main goal of the invention results, in that the interference signal is filtered out. This is achieved by a peak compensation unit, which removes from the response signal the interference signal resulting from the charge-reversal of the piezodrive. A further advantage of the peak compensation unit is that the duration of the charge-reversal process of the piezodrive is simultaneously minimized. In the peak compensation unit are located at least one suppression unit having at least one switch element, which is controlled by the exciter signal of the feedback electronics. The effect of the peak compensation unit is that the piezodrive is connected conductively with ground during the rising and/or falling edges of the exciter signal. The whole problem arises because a piezodrive is used both for the oscillation excitement and for the oscillation detection. If the excitement and detection functions are implemented using two piezoelectric elements, then a connection of the two elements only occurs through the mechanically oscillatable unit. Consequently, the charge-reversal signal of the exciting unit only has a negligible effect on the mechanically oscillatable unit and is, above all, not detected by the detecting unit. Thus, in the case of separated exciting and detection, use of the invention is not required.

An embodiment provides a current-to-voltage converter. Via this, the response signal, which is a current signal, is converted into a voltage signal. A cost-favorable embodiment implements this via a resistor connected to ground.

In an advantageous embodiment, the peak compensation unit contains a resistor, which is dimensioned such that the time constant (t1) of the duration of the charge-reversal process of the piezodrive is minimized. In this embodiment, the resistor can also be omitted, i.e. it would have a resistance of zero ohms, in which case, however, resistances—here not specified in further detail—required for reasons of explosion protection or other, internal resistances of the components still must be taken into consideration. The advantage of this smallest possible resistor is that the time constant (t1) of the duration of the charge-reversal process is minimized, since the constant depends on the capacitance of the capacitor and the resistance value of the resistor forming an RC-element with the capacitor.

An advantageous embodiment is symmetric and provides in the peak compensation unit two suppression units. In such case, the first suppression unit is controlled by the falling edges and the second suppression unit by the rising edges of the exciter signal.

According to a favorable embodiment, the peak compensation unit contains at least one differentiating element, to which the exciter signal is applied. The differentiating element controls the switch element. The output voltage of the differentiating element represents the derivative of the exciter signal. This enables simple control of the switch element. A simple and cost-saving embodiment is one in which the differentiating element is an RC-element with a capacitor and a resistor.

In a second embodiment, the object is achieved according to the invention by providing in the peak compensation unit, at least one amplifying element, which amplifies the response signal of the piezodrive, and whose amplification factor is controllable by the exciter signal of the feedback electronics such that the amplification factor is minimal during the rising and/or during the falling edges of the exciter signal. A basic idea of this second solution of the object is, thus, that the response signal is amplified, with the amplification factor, however, not being constant. In this way, the peaks in the response signal can be removed, or their effect markedly reduced, in that the corresponding sections of the response signal receive only a very small—as minimal as possible—amplification, in comparison to the remaining sections. The amplifying unit thus reinforces the response signal, with the exception of the sections with the charge-reversal signal. The amplifying unit can, for this, be placed before the actual feedback electronics, or can be a component thereof. Minimal amplification means, in this connection, that the difference between the amplification during the edges and outside of the edges is so great that the feedback electronics is not, or at least not negatively, influenced by the peaks associated with the edges.

Common to both of the solutions of the object of the invention is that the sections of the response signal, in which the charge-reversal signals are located, do not reach the feedback electronics, in that they are removed by the peak compensation unit, which is controlled by the exciter signal. Either the response signal is directed to ground, or the amplification of the response signal is markedly reduced. The response signal is, thus, in both embodiments, in effect, multiplied by a comb function, which, with exception of the sections with peak, is constant with a value not equal to zero, and at the times of these sections with peak, zero or at least very small. The synchronization of response signal and this function is achieved by applying the exciter signal not only to the piezodrive, but, also, to the peak compensation unit.

An embodiment provides that the amplifying unit is a charge amplifier. This embodiment is sensible, since the piezodrive produces a current signal. Furthermore, in this case, no components e.g. for the converting of the current signal into a voltage signal are necessary.

An embodiment includes that the amplification factor during the rising and/or during the falling edges of the exciter signal is approximately zero. In this way, the peaks are almost completely removed from the response signal. The amplification can, however, also lie below a certain limit value, which is given by the feedback electronics in such a manner that interfering effects from the charge-reversal signal do not arise. If the amplification during the edges is approximately zero, then the amplification factor can also be one, for example.

An embodiment provides that, in the peak compensation unit, at least one switch element is provided, which controls the amplification factor of the amplifying unit, and that, in the peak compensation unit, at least one differentiating element is provided, to which the exciter signal is applied. The differentiating element controls the switch element, with the output voltage of the differentiating element being the derivative of the exciter signal. The switch element controls the amplification factor of the amplifier unit and is itself controlled by the derivative of the exciter signal. This is thus similar to the corresponding units in the first embodiment of the solution of the object of the invention already discussed above.

The following embodiments apply for both solutions of the object of the invention.

A favorable embodiment includes that the switch element is an electric component, which changes its conductivity as a function of an applied voltage. In the first embodiment, this switch element is present in the suppression unit. An advantage is that, in this way, the exciter signal, or its derivative, can be worked with. A very simple and cost-conscious embodiment provides that the switch element is a semiconductor switch, e.g. a field effect transistor in general or, specifically, a MOSFET. For protecting the switch element, at least one protective element is provided for the switch element, for protecting the switch element against too high voltages and/or against voltages of sign for which the conductivity of the switch element does not change, in that it only acts as a switch element in the case of voltages of positive or negative sign. Useful as protective elements are, for example, diodes, which, depending on the sign of the voltage applied to them, short circuit the capacitor of the RC-element directly to ground, so that the signal of the RC-element declines very rapidly at the switch element.

Advantageous is an embodiment, in which the exciter signal is a periodic, rectangular signal, or a periodic, trapezoidal signal. By steep edges, the charge-reversal process is more strongly limited in time, than is the case for an exciter signal with flatter edges. The disadvantage of a rectangular signal, however, is that then also higher resonances can be excited. This is prevented in the case of trapezoidally shaped signals.

BRIEF DESCRIPTION OF THE DRAWINGS

The invention will now be explained in greater detail on the basis of the drawings, the figures of which show as follows.

DESCRIPTION OF THE PREFERRED EMBODIMENTS

Figure 1:
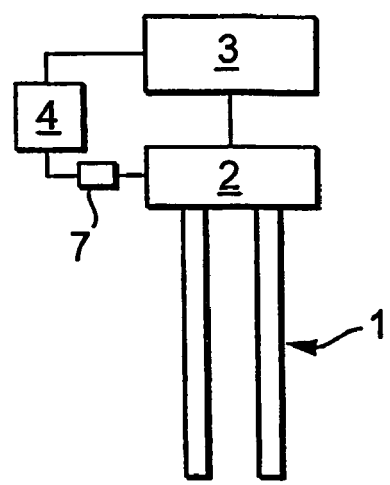
FIG. 1 is a block diagram of the vibration resonator.

FIG. 1 shows the essential construction of the vibration resonator. The oscillatable element 1 is connected with the piezodrive 2. This piezodrive 2 is excited to oscillate by the feedback electronics 3, whereby, as a consequence thereof, the mechanically oscillatable unit 1 is caused to oscillate. The piezodrive 2, in turn, detects the oscillations of the mechanically oscillatable unit 1 and transmits such in the form of the response signal 21 via the current-to-voltage converter 7 and the peak compensation unit 4 to the feedback electronics 3. Shown for the mechanically oscillatable unit is a tuning fork; however, the use of an oscillating rod would, likewise, be possible.

Figure 2:
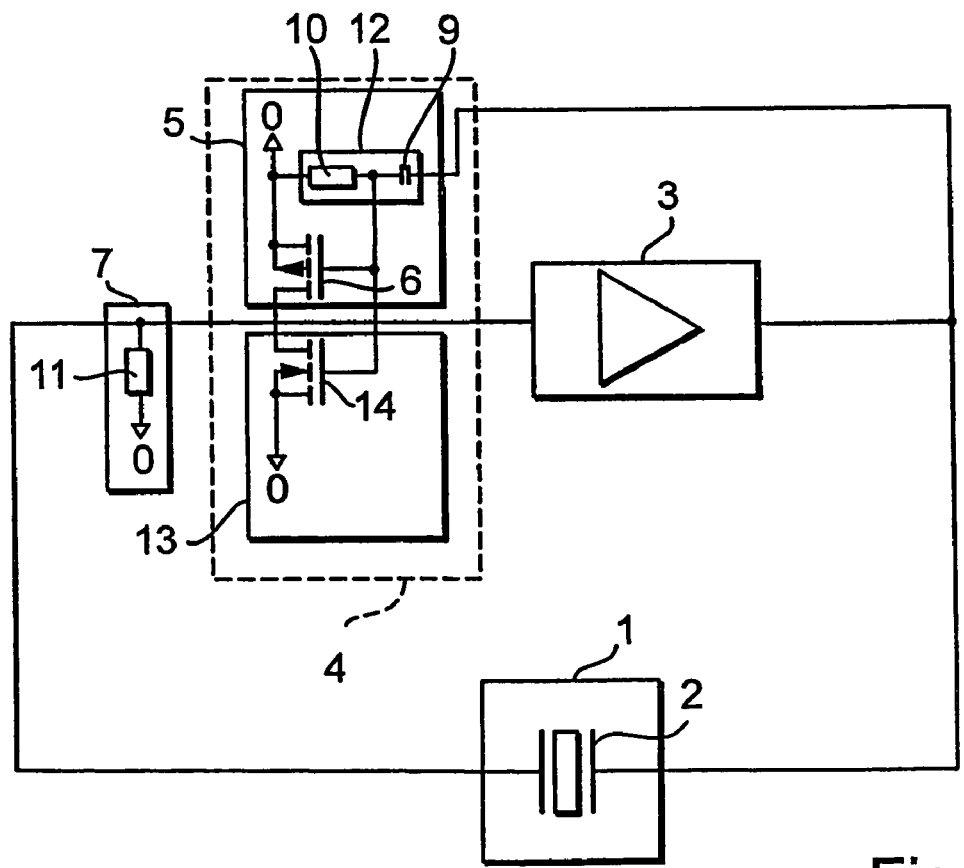
FIG. 2 is a block diagram of the first embodiment of the device of the invention for operating the oscillatable unit of the vibration resonator.

FIG. 2 shows a block diagram for a preferred implementation of the device for operating the oscillatable unit 1 of a vibration resonator. In this circuit, only a bare minimum of components for the peak compensation unit 4 is used. The feedback electronics 3 produces the exciter signal 20, which excites the piezodrive 2, as part of the oscillatable unit, to oscillate. The exciter signal 20 is, here, a rectangular signal. Possible are also trapezoidally shaped signals, which prevent the excitement of higher modes, or higher harmonics, of the mechanically oscillatable unit. Through the oscillations, a response signal 21 of the piezodrive results, which is fed back to the feedback electronics 3.

During the edges of the exciter signal 20, i.e. by the change of the sign of the voltage change, the piezodrive 2 undergoes charge-reversal, and a charge-reversal current transient results, which decays exponentially with the time constant t1. In the response signal 21, this peak shows-up as interference signal 22. The time constant t1 depends on the capacitance of the piezodrive 2 and a total resistance, with which the piezodrive 2 forms an RC-element. In the illustrated example, involved is the resistor 11, as well as further, not-illustrated, internal resistances of the circuit, which can be required, for instance, for reasons of explosion protection. These high charge-reversal signals represent an interference for the evaluation of the response signal 21; only the wanted signal of the oscillatable unit 1 is relevant. This wanted signal is the oscillation detection signal, from whose frequency and amplitude physical variables of the medium can be determined. The interference signal 22 is a function of the sizes of the components being used and delivers no information concerning the measurement of interest.

For suppressing the interference signal 22, first the response signal 21, which is a current signal, is converted via a current-to-voltage converter 7 into a voltage signal. In the simplest embodiment, this involves a resistor 11, which is tied to ground. Behind the current-to-voltage converter 7 is the peak compensation unit 4. In the illustrated case, two suppression units 5 and 13 are provided. The suppression unit 5 serves for suppression during the falling edges of the exciter signal 20 and suppression unit 13 serves for suppression during the rising edges. Each of these suppression units 5, 13 is composed of a switch element 6, 14 and is controlled by a differentiating element 12, to which the exciter signal 20 is applied. In the illustrated embodiment, the differentiating element 12 is an RC-element, composed of a capacitor 9 and a resistor 10. The switch elements 6 and 14 are semiconductor switches, for example MOSFETs. The semiconductor switches used in the invention are markedly less expensive than e.g. those in Patent DE 196 21 449. For example, the field effect transistors can be 2N7002 or TP0610. These are two examples from a large number of possibilities. The switch elements 6, 14 of the suppression units 5, 13 differ from one another as regards which sign of the applied voltage caused a switching of the switch element. This involves, thus, e.g. n- or p-channel MOSFETs. In this special embodiment, it should, however, be heeded that the switch elements 6 and 14 are not damaged by the voltages of the wrong sign. The properties of the named field effect transistors 2N7002 and TP0610 protect against such damage.

The edges of the exciter signal bring about the signal 24 on the RC-element that controls the switch elements 6 and 14. The signal 24 represents the derivative of the exciter signal 20, so that the RC-element thus works as a differentiating element. Additionally, the signal resembles the interference signals 22 of the piezodrive 2, since it, likewise, results from the charge-reversal process. The signal 24 decays with the time constant t2, which is determined by the capacitance of the capacitor 9 and by the resistance 10. As will be shown below, each of the switch elements 6, 14 is so designed, that it changes its conductivity, respectively, during the falling, or rising, edges and, so short-circuits the piezodrive 2 to ground. The short-circuit lasts until the signal 24 falls below a certain threshold, below which the switch element 6 or 14 is no longer conductive. This threshold depends on the design of the switch elements 6, 14. During this time, the response signal 21 does not reach the feedback electronics 3. Furthermore, the total resistance of the RC-element, whose capacitance is given by the piezodrive 2, is minimized, and, consequently, also the time constant t1 of the charge-reversal process of the piezodrive 2. Advantageously, the time t2 is chosen at least equal to or larger than t1, so that the interference signals 22 are always reliable cut out of the response signal 21.

Advantages of the invention are that cost-favorable components are used, since, among other things, operational amplifiers, e.g. an analog switch, or an exclusive-or gate can be omitted. In total, two resistors, a capacitor and two semiconductor switches are needed for the peak compensation unit 4 and the current-to-voltage converter 7.

Figure 3:
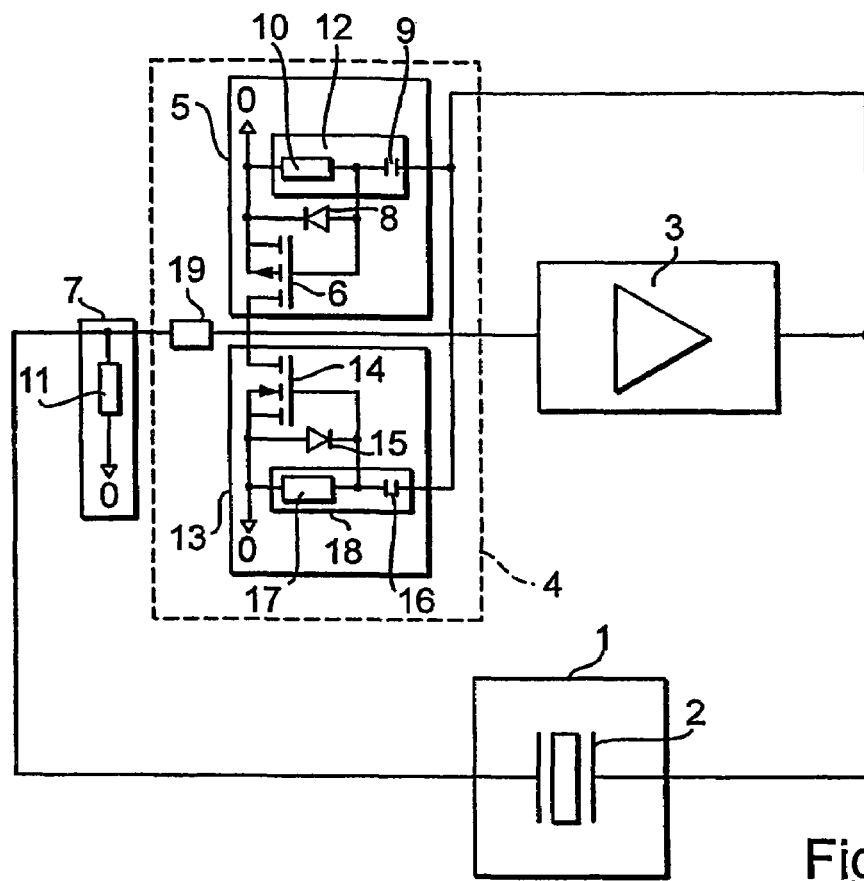
FIG. 3 is a block diagram of a further development of the device.

FIG. 3 represents an expanded embodiment of the circuit in FIG. 2. The additions include that a resistor 19 is inserted before the peak compensation unit 4. This limits the charge-reversal current of the piezodrive 2 and prevents too great of a loading of the feedback electronics 3. During the edges of the exciter signal, this resistor is connected to ground, and the response signal 21 does not reach the feedback electronics 3. Since, in this case, the resistor 11 of the current-to-voltage converter 7 and the resistor 19 are both brought to ground, they are in parallel, and the total resistance is smaller than the smallest, individual value. Consequently, the charge-reversal time t1 is then also minimized.

Furthermore, protective elements 8, 15 are provided in each of the suppression units 5, 13. In the illustrated example, these are diodes, which limit the voltage applied to the separate switch elements 6, 14 during the times outside of the edges of the exciter signal 20 and thus protect them against too high voltages. Additionally, it is prevented that voltages of the wrong sign reach the separate switch elements, signs for which the switch element 6, 14 does not change its conductivity. Consequently, also semiconductor switches can be used, which cannot tolerate voltages with the "wrong" signs. I.e., using the added diodes, the demands on the semiconductor switches are reduced.

In addition, each of the two suppression units has its own differentiating element 12, 18. The selection of the time constants t2, t3 associated with these differentiating elements 12, 18 should be such that both are at least equal to, or larger than the time constant t1 of the piezodrive 2.

Figure 4:
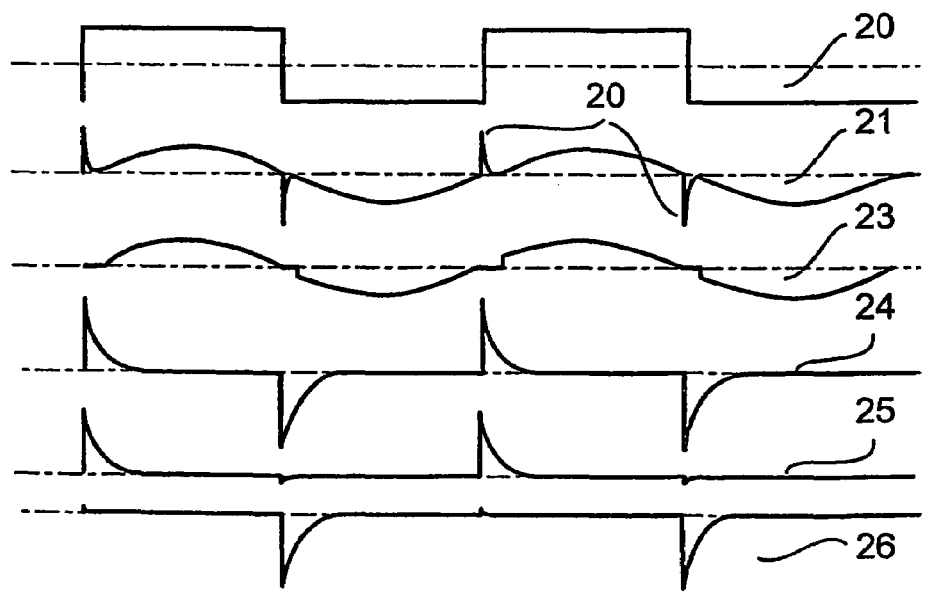
FIG. 4 plots of signals with respect to time.

FIG. 4 shows the waveforms of the involved signals. The exciter signal 20 is, in the illustrated case, a rectangular signal with steeply rising and falling edges. In the practical implementation, however, the components are apt to produce an exciter signal 20 that is more trapezoidal. The response signal 21 is composed of the wanted signal, which in this case is sinusoidal, and the interference signals, which result from the charge-reversal of the piezodrive 2 and which decay exponentially. By reason of the peak compensation unit 4, signal 23 appears on the input of the feedback electronics 3; the interference signals 22 have been removed from signal 23. Signal 24 is the signal of the differentiating element 12 in the embodiment of FIG. 1. The signals 25 and 26 are the signals of the differentiating elements 18 and 12 in the embodiment of FIG. 2. In the case of these two signals 25, 26, one sees also quite clearly the effect of the protective elements 8, 15, which in this example are diodes. By these, depending on the type of edge, the capacitors 9, 16 are short-circuited to ground. Therefore, the signal falls almost immediately to zero again. In the case of the other edge, the diodes 8, 15 block, and the capacitors 9, 16 then form an RC-element with the associated resistances 10, 17, resulting in a corresponding time constant for the decay of the signal.

Figure 5:
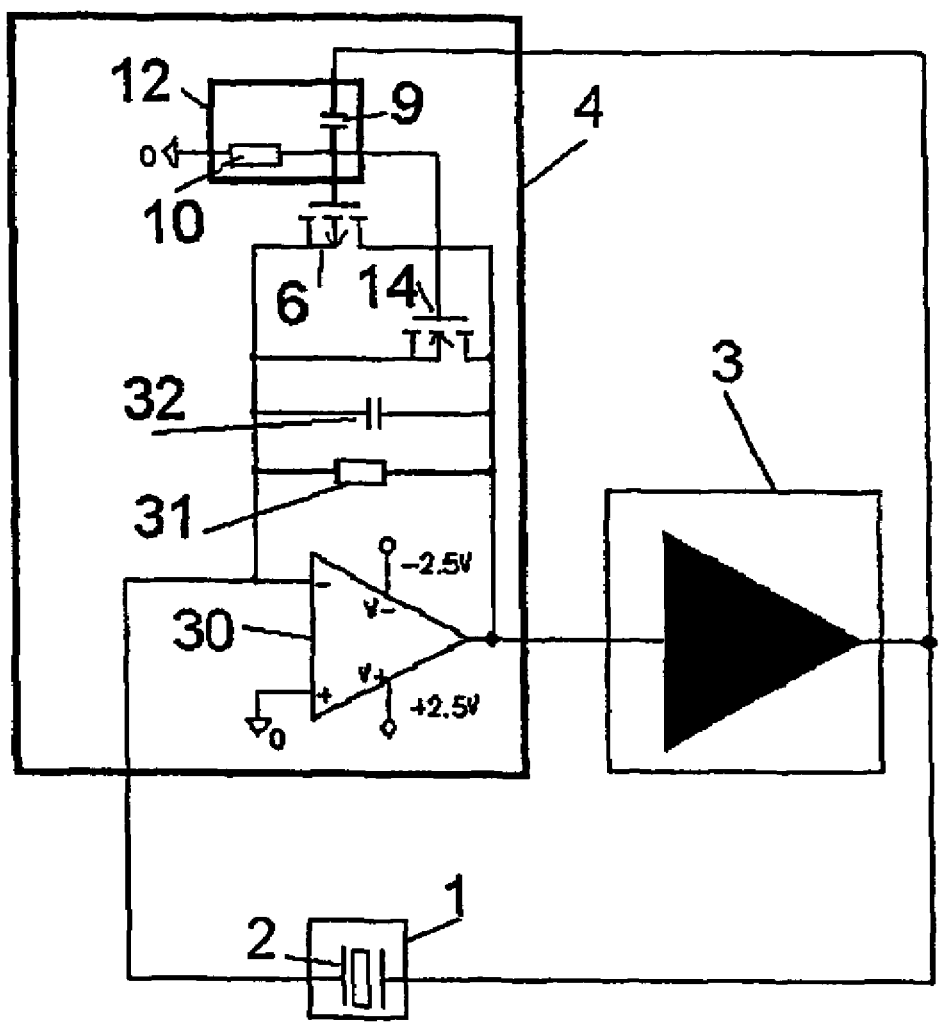
FIG. 5 is a block diagram of the second embodiment of the device of the invention.

FIG. 5 shows the second embodiment of the solution of the object of the invention. In the peak compensation unit 4, an amplifying unit 30 is provided, which amplifies the response signal 21 of the piezodrive 2. In the simplest embodiment, the amplifying unit 30 is a charge amplifier. The amplification factor is controlled by the exciter signal 20 of the feedback electronics 3. As in the case of the embodiment above, the exciter signal is applied to the differentiating element 12, which is an RC-element—composed of a capacitor 9 and a resistor 10 referenced to ground—and which produces the signal 24 as derivative of the exciter signal 20. The switch elements 6, 14 are—as already explained above—each of a character such that they change their conductivity during the falling, or the rising, edges, as the case may be, and, consequently, connect the output of the amplifying unit 30 conductively with the minus input. The amplification factor depends, in such case, among other things, on the ohmic resistance, which is determined by the resistor component 31, by the capacitor 32—which serves for smoothing—and by the switch elements 6, 14. If, by the derivative of the exciter signal 20, one of the switch elements 6, 14 is closed, then this total resistance value falls to zero, and, consequently, also the amplification factor goes to zero. How long the amplification factor remains at zero depends on the dimensioning of the RC-element. This corresponds, likewise, to the first embodiment of the invention (see FIGS. 2 and 3 and the corresponding descriptions). The further development of the circuit in FIG. 5 can likewise contain at least one protective element. Further details will be evident to those skilled in the art.

The invention claimed is:

1. A device for operating an oscillatable unit of a vibration resonator, comprising:
    feedback electronics;
    a piezodrive connected with the oscillatable unit, and said feedback electronics, said feedback electronics excites said piezodrive to oscillate by means of a periodic exciter signal having rising and falling edges, and a response signal of said piezodrive is fed back to said feedback electronics; and
    at least one peak compensation unit, which removes from the response signal at least one interference signal, which results from the charge-reversal process of the piezodrive; wherein:
    said at least one peak compensation unit has at least one amplifying unit which amplifies the response signal of said piezodrive, and whose amplification factor is controllable by the exciter signal of said feedback electronics in such a manner that the amplification factor is minimal during the rising and/or during the falling edges of the exciter signal.

2. The device as claimed in claim 1, wherein:
    said amplifying unit is a charge amplifier.

3. The device as claimed in claim 1, wherein:
    the amplification factor is approximately zero during the rising and/or during the falling edges of the exciter signal.

4. The device as claimed in claim 1, wherein:
    said peak compensation unit has at least one switch element which controls the amplification factor of said amplifying unit, and at least one differentiating element on which the exciter signal is applied and which controls said switch element; and
    the output voltage of said differentiating element represents the derivative of the exciter signal.

5. The device as claimed in claim 4, wherein:
    said switch element is an electric component, which changes its conductivity as a function of an applied voltage.

6. A device for operating an oscillatable unit of a vibration resonator, comprising:
    feedback electronics;
    a piezodrive connected with the oscillatable unit, and said feedback electronics, said feedback electronics excites said piezodrive to oscillate by means of a periodic exciter signal having rising and falling edges, and a response signal of said piezodrive is fed back to said feedback electronics; and
    at least one peak compensation unit which removes from the response signal at least one interference signal, which results from the charge-reversal process of said piezodrive, wherein:
    said peak compensation unit, has at least one suppression unit, with at least one switch element, with said switch element being controlled by said periodic exciter signal of said feedback electronics in such a way, that said piezodrive is connected conductively to ground during the rising and/or during the falling edges of said periodic exciter signal, and
    said peak compensation unit is provided with a resistor, which is dimensioned such that the time constant of the duration of the charge-reversal process of said piezodrive is minimized.

7. The device as claimed in claim 6, wherein:
    said switch element is an electric component, which changes its conductivity as a function of an applied voltage.

8. The device as claimed in claim 6, wherein:
    the response signal is a current signal; and
    a current-to-voltage converter is provided, which converts the current signal into a voltage signal.

9. The device as claimed in claim 8, wherein:
    said current-to-voltage converter is a resistor, which is connected to ground.

10. A device for operating an oscillatable unit of a vibration resonator, comprising:
   feedback electronics;
   a piezodrive connected with the oscillatable unit, and said feedback electronics, said feedback electronics excites said piezodrive to oscillate by means of a periodic exciter signal having rising and falling edges, and a response signal of said piezodrive is fed back to said feedback electronics; and
   at least one peak compensation unit which removes from the response signal at least one interference signal, which results from the charge-reversal process of said piezodrive, wherein:
   said peak compensation unit, has a first suppression unit and a second suppression unit, with at least one switch element, with said switch element being controlled by said periodic exciter signal of said feedback electronics in such a way, that said piezodrive is connected conductively to ground during the rising and/or during the falling edges of said periodic exciter signal; and
   said first suppression unit is controlled by the falling edges and said second suppression unit is controlled by the rising edges of the exciter signal.

11. A device for operating an oscillatable unit of a vibration resonator, comprising:
   feedback electronics;
   a piezodrive connected with the oscillatable unit, and said feedback electronics, said feedback electronics excites said piezodrive to oscillate by means of a periodic exciter signal having rising and falling edges, and a response signal of said piezodrive is fed back to said feedback electronics; and
   at least one peak compensation unit which removes from the response signal at least one interference signal, which results from the charge-reversal process of said piezodrive, wherein:
   said peak compensation unit, has at least one suppression unit, with at least one switch element, with said switch element being controlled by said periodic exciter signal of said feedback electronics in such a way, that said piezodrive is connected conductively to ground during the rising and/or during the falling edges of said periodic exciter signal;
   said peak compensation unit further has at least one differentiating element to which the exciter signal is applied, and which controls said switch element; and
   the output voltage of said differentiating element represents the derivative of the exciter signal.

12. The device as claimed in claim 10, wherein:
   the response signal is a current signal; and
   a current-to-voltage converter is provided, which converts the current signal into a voltage signal.

13. The device as claimed in claim 12, wherein:
   said current-to-voltage converter is a resistor, which is connected to ground.

14. The device as claimed in claim 11, wherein:
   the response signal is a current signal; and
   a current-to-voltage converter is provided, which converts the current signal into a voltage signal.

15. The device as claimed in claim 14, wherein:
   said current-to-voltage converter is a resistor, which is connected to ground.

* * * * *